United States Patent [19]

Clewell, Jr. et al.

[11] 3,947,602

[45] Mar. 30, 1976

[54] TREATMENT OF COOKING OIL

[75] Inventors: Willard S. Clewell, Jr.; Bernard Friedman, both of Allentown, Pa.

[73] Assignee: Bernard Friedman, Allentown, Pa.

[22] Filed: Apr. 29, 1974

[21] Appl. No.: 464,940

[52] U.S. Cl. .................. 426/417; 260/424; 426/438

[51] Int. Cl.[2] ......................... A23D 5/04; C11B 3/04

[58] Field of Search ........... 426/530, 417, 194, 362, 426/431, 438, 429; 260/424; 99/330, 408

[56] References Cited

UNITED STATES PATENTS

| | | | |
|---|---|---|---|
| 1,856,571 | 5/1932 | Lourens | 260/424 |
| 2,441,923 | 5/1948 | Sullivan | 426/417 |
| 2,767,095 | 10/1956 | Smith, Jr. | 426/438 |
| 3,167,435 | 1/1965 | Hall | 426/417 |
| 3,210,193 | 10/1965 | Martin | 99/330 X |
| 3,231,390 | 1/1966 | Hoover | 426/417 |
| 3,346,391 | 10/1967 | Miller et al. | 426/417 |
| 3,562,301 | 2/1971 | Fryer et al. | 260/424 X |
| 3,590,059 | 6/1971 | Velan | 260/424 X |
| 3,649,290 | 3/1972 | Angold | 426/438 X |

FOREIGN PATENTS OR APPLICATIONS

| | | | |
|---|---|---|---|
| 13,151 | 7/1900 | United Kingdom | 260/424 |

OTHER PUBLICATIONS

Boily's "Industrial Oil and Fat Products" by Mattil et al., Published by Interscience Publishers, N.Y., 3rd Edition, 1964, p. 291.

*Primary Examiner*—Frank W. Lutter
*Assistant Examiner*—N. Greenblum
*Attorney, Agent, or Firm*—Marn & Jangarathis

[57] ABSTRACT

The useful life of cooking oil is increased by treating the cooking oil with a food compatible acid to counteract the adverse effect of food juices which are dissolved in the cooking oil. The cooking oil is generally also contacted with a suitable adsorbent, such as an activated carbon, to adsorb soluble oxidized and/or pyrolytic contaminants.

7 Claims, 1 Drawing Figure

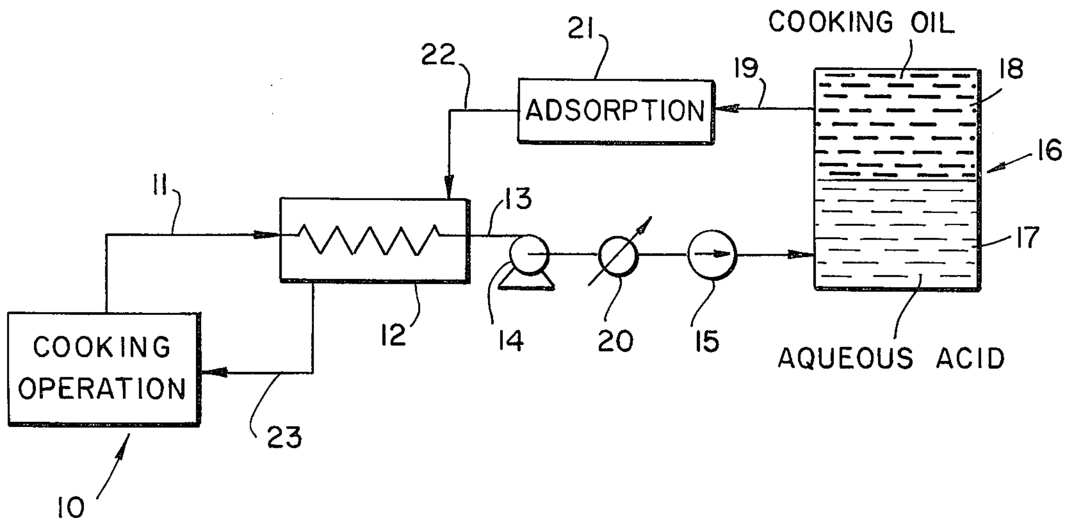
COOKING OIL
ADSORPTION
AQUEOUS ACID
COOKING
OPERATION
21
22
19
18
16
17
11
13
12
14
20
15
23
10

TREATMENT OF COOKING OIL

The present invention relates to the treatment of cooking oils.

Cooking oils employed for cooking foods, as for example in deep fat fryers, are generally treated to separate insoluble material therefrom and thereby prolong the life of the cooking oil. Not withstanding such treatment, the cooking oil is generally used for only about 1 to 3 days, and must be discarded after such time. Accordingly, there is a need to increase the useful like of such cooking oils.

The principal object of the present invention is to increase the useful life of cooking oils.

In accordance with the present invention, the useful life of a cooking oil is increased by contacting the cooking oil with a food compatible acid, followed by separation of the oil and acid. Applicant has found that one of the factors contributing to the relatively short useful life of cooking oil is the presence, in the oil, of soluble food juices, i.e., the soluble food juices have an adverse effect on the cooking oil in that such soluble food juices limit the useful life of the cooking oil, and that by contacting the oil, with a food compatible acid, the adverse effects of the soluble food juices are counteracted, thereby increasing the useful life of the cooking oil.

The acid which is employed for treating the cooking oil may be any one or more of a wide variety of food compatible acids, such as citric, tartaric, acetic, phosphoric, malic. The treatment is preferably effected with citric acid or a blend of two or more of the food compatible acids.

The acid is preferably employed as an aqueous solution in that an aqueous solution of the acid can be easily separated from the cooking oil. It is to be understood, however, that the acid may be used with other vehicles, provided that such other vehicle is capable of being separated from the cooking oil.

In accordance with one embodiment of the invention, a soluble inert salt, such as sodium chloride, is added to the aqueous solution of the food compatible acid to change the density thereof and thereby facilitate separation of the aqueous acid solution from the cooking oil. Any compound which does not adversely affect the cooking oil or the food compatible acid can be employed to change the density of the acid treating solution, and the use of a salt to change the density is particularly applicable to a batch operation.

The acid solution is employed in amounts sufficient to counteract the adverse effects of the food juices in the cooking oil. The concentration of the acid in the solution can vary over a wide range, and as should be apparent to those skilled in the art, lower concentrations require the use of greater amounts of solution and/or more frequent replacement of the acid treating solution. The selection of an optimum concentration is deemed to be well within the scope of those skilled in the art from the teachings herein.

Although applicants do not intend to limit the overall scope of the present invention by theoretical reasoning, it is believed that the acid reacts with the food juices thereby rendering the food juices water soluble, whereby the food juices are extracted from the cooking oil into the aqueous acid treating solution. It is to be understood, however, that in some cases, it is also possible that the acid reacts with the food juices to counteract the adverse effects, without making the food juices water soluble or extractable; i.e., the reaction product of the food juices and acid reduces and/or eliminates the adverse effect of the food juices on the useful life of the cooking oil. Accordingly, the present invention resides in contacting the cooking oil with a food compatible acid to counteract the adverse effect of soluble food juices, irrespective of whether the food juices are in fact extracted into the aqueous acid.

The conditions at which the treatment is effected can vary over a wide range. Thus, for example, the treatment can be effected at temperatures from room temperature up to the boiling point of the treating solution at the prevailing pressure. The specific temperature conditions employed have not been found to have a significant effect on the treatment.

The cooking oil may be regenerated in a batch or a continuous operation. The cooking oil is generally treated by introducing and dispersing the cooking oil in the acid treatment solution, with the treated oil rising through the treatment solution and forming a separate layer above the treatment solution. It is to be understood that other procedures could be employed, such as for example, a continuous countercurrent extraction or centrifugation. The selection of a particular procedure for effecting contact between the cooking oil and treatment solution to extract food juices from the cooking oil is deemed to be well within the scope of those skilled in the art from the teachings herein.

It has been found that the used cooking oil contains, in addition to the soluble food juices, soluble oxidized contaminants and/or soluble pyrolytic contaminants. These contaminants can also be removed from the cooking oil by contacting the cooking oil with any one of a wide variety of known adsorbents to thereby adsorb such contaminants. As representative examples of such adsorbents, there may be mentioned: fullers earth, silica gel, bauxite, activated carbon, alumina, diatamaceous earth, etc. The preferred adsorbent is an activated carbon. The adsorbing step may be effected before or after, preferably after, the treatment with a food compatible acid, as hereinabove described.

The cooking oil generally also contains insoluble contaminants which can be separated therefrom, as known in the art; e.g., by filtration.

The invention will be further described with respect to the following drawing wherein:

The drawing is a simplified schematic flow diagram of a continuous operation for treating cooking oil in accordance with the present invention.

Referring to the drawing, a cooking operation which uses a cooking oil is schematically indicated as 10. Thus, for example, such a cooking operation could be comprised of one or more friers which use cooking oil for the cooking, for example, of vegetables, such as onions, potatoes etc; meats, fish, or fowl.

Cooking oil which is to be treated is withdrawn from cooker 10 through line 11 and passed through a heat exchanger 12 wherein the cooking oil is cooled by indirect heat transfer with treated cooking oil being returned to cooker 10, as hereinafter described. The cooled cooking oil in line 13, which includes pump 14 and check valve 15, is introduced into an extraction vessel schematically indicated as 16. A cooler 20 is optionally employed in the event further cooling of the cooking oil is required to prevent boiling of the treating solution. The extraction vessel includes a body of treating liquid, schematically indicated as 17, for counteracting the adverse effect of the food juices in the cooking oil. As hereinabove described, the treating liquor is comprised of a solution of a food compatible acid or acids. The cooking oil is preferably introduced into the treating liquid 17 in a dispersed state to increase the contact between the cooking oil and treating solution. For example, the cooking oil can be bubbled into the treating solution.

The cooking oil introduced into vessel 16 rises through the treating solution 17 whereby the cooking oil is contacted with the treating solution to thereby counteract the adverse effect of the soluble food juices. As a result of the density difference between the cooking oil and treating solution, the cooking oil forms a separate phase, schematically indicated as 18, above the treating solution.

Cooking oil, essentially free of food juices, is withdrawn from extraction vessel 16 through line 19 and passed through an adsorption zone 21, including a suitable adsorbent, such as activated carbon, to remove soluble oxidized and pyrolyzed contaminants therefrom. In the adsorption zone, some or all of the insoluble components may be separated from the cooking oil by filtration through the adsorption media. If required, a separate filter could be provided for separating insoluble components from the cooking oil.

In accordance with a preferred embodiment, the adsorption zone 21 is provided with means for heating the oil to prevent solidification thereof during periods when the cooking oil is to be treated, and the fryer is not in operation. Thus, for example, during non-working hours, the cooking oil from the cooking operation can be passed through the treating operation with the heating means activated to maintain the cooking oil in a fluid state. It is also to be understood that such a heating means need not be provided in the adsorption zone in that the heating means could be employed as a separate piece of equipment.

The cooking oil withdrawn from zone 21, through line 22, is passed through heat exchanger 12 wherein the cooking oil is heated by indirect heat transfer with the cooking oil withdrawn from cooker 10. The heated cooking oil from heat exchanger 12 is recycled to cooker 10 through line 23.

It is to be understood that the body of treating liquid 17 in vessel 16 must be periodically replaced in order to maintain the effectiveness thereof.

It is also to be understood that it is not necessary to treat the cooking oil at the rate at which juices are formed. Accordingly, cooking oil can be periodically withdrawn from the cooker for treatment, as hereinabove indicated. If possible all or a portion of the treatment cycle can be effected when the cooker is not in operation.

It is further to be understood that although the process for treating cooking oil in accordance with the present invention has been hereinabove described with respect to a continuous operation, such treatment can be effected as a batch operation.

The present invention is particularly advantageous in that the useful life of a cooking oil is greatly increased and in this manner, overall costs are reduced. Thus, for example, cooking oil, at a temperature of 180°F, is passed, at a rate of 2 to 3 gallons per hour, through 2 gallons of aqueous citric acid, containing 8 oz. of citric acid, with the treating solution being changed every 24 hours. The cooking oil is employed for cooking over a period of at least 1 week.

What is claimed is:

1. A process for treating a used cooking oil which has been employed for the cooking of food, comprising:

contacting the used cooking oil with a solution having dissolved therein a food compatible acid in an amount and concentration sufficient to extract from the cooking oil food juice components in the oil derived from the food being cooked; and separating the acid solution from the cooking oil prior to reuse of said cooking oil to thereby increase the life of the cooking oil.

2. The process of claim 1 wherein said solution is an aqueous solution of the food compatible acid which is immisible with the cooking oil whereby the cooking oil and aqueous solution are separated by phase separation.

3. The process of claim 2 wherein the food compatible acid is selected from the group consisting of citric, malic, phosphoric, acetic and tartaric acid and mixtures thereof.

4. A process for treating a cooking oil used for the cooking of food in a cooking zone, comprising:

withdrawing from the cooking zone cooking oil having food juice components therein derived from the food being cooked;

contacting the cooking oil with an aqueous solution of a food compatible acid in an amount and concentration sufficient to extract food juice components from the cooking oil;

separating the cooking oil from the aqueous solution prior to reuse of said cooking oil;

contacting the cooking oil with an adsorbent to adsorb soluble oxidized and pyrolytic contaminants; and recycling the cooking oil to the cooking zone.

5. The process of claim 4 wherein the adsorbent is activated carbon.

6. The process of claim 4 wherein the food compatible acid is selected from the group consisting of citric, acetic, phosphoric, malic and tartaric acids and mixtures thereof.

7. The process of claim 6 wherein the aqueous solution of food compatible acid is immisible with the cooking oil and the cooking oil and aqueous solution are separated by phase separation.

* * * * *